(12) United States Patent
Stiborek et al.

(10) Patent No.: US 10,015,192 B1
(45) Date of Patent: Jul. 3, 2018

(54) SAMPLE SELECTION FOR DATA ANALYSIS FOR USE IN MALWARE DETECTION

(71) Applicant: CISCO TECHNOLOGY, INC., San Jose, CA (US)

(72) Inventors: Jan Stiborek, Prague (CZ); Martin Rehak, Prague (CZ)

(73) Assignee: Cisco Technology, Inc., San Jose, CA (US)

( * ) Notice: Subject to any disclaimer, the term of this patent is extended or adjusted under 35 U.S.C. 154(b) by 292 days.

(21) Appl. No.: 14/934,398

(22) Filed: Nov. 6, 2015

(51) Int. Cl.
*H04L 29/06* (2006.01)
*G06F 17/30* (2006.01)

(52) U.S. Cl.
CPC ...... *H04L 63/145* (2013.01); *G06F 17/30598* (2013.01); *H04L 63/1416* (2013.01)

(58) Field of Classification Search
CPC . H04L 63/14; H04L 63/1416; H04L 63/1441; H04L 63/145; G06F 17/30598; G06F 21/50; G06F 21/52; G06F 21/53
See application file for complete search history.

(56) References Cited

U.S. PATENT DOCUMENTS

| | | | | |
|---|---|---|---|---|
| 9,747,446 B1* | 8/2017 | Pidathala | ............... | G06F 21/566 |
| 2007/0136455 A1* | 6/2007 | Lee | ....................... | G06F 21/564 |
| | | | | 709/223 |
| 2012/0304244 A1* | 11/2012 | Xie | ........................ | G06F 21/00 |
| | | | | 726/1 |
| 2013/0041650 A1 | 2/2013 | Phillips | | |
| 2013/0326625 A1* | 12/2013 | Anderson | ............... | G06F 21/56 |
| | | | | 726/23 |
| 2015/0244733 A1* | 8/2015 | Mohaisen | ........... | H04L 63/1425 |
| | | | | 726/23 |
| 2017/0026391 A1* | 1/2017 | Abu-Nimeh | ........ | H04L 63/1416 |

OTHER PUBLICATIONS

Bayer, U., Comparetti, P., amp; Hlauschek, C. (2009). Scalable, Behavior-Based Malware Clustering. NDSS.
Rieck, K., et al. "Learning and classification of malware behavior",Proceedings of the 5th Intl Conf on Detection of Intrusions and Malware and Vulnerability Assessment, 2008.

* cited by examiner

*Primary Examiner* — Hadi S Armouche
*Assistant Examiner* — Alexander R Lapian
(74) *Attorney, Agent, or Firm* — Cindy Kaplan (57) ABSTRACT

In one embodiment, a method includes creating a set of network related indicators of compromise at a computing device, the set associated with a malicious network operation, identifying at the computing device, samples comprising at least one of the indicators of compromise in the set, creating sub-clusters of the samples at the computing device, and selecting at the computing device, one of the samples from the sub-clusters for additional analysis, wherein results of the analysis provide information for use in malware detection. An apparatus and logic are also disclosed herein.

16 Claims, 5 Drawing Sheets

SAMPLE SELECTION FOR DATA ANALYSIS FOR USE IN MALWARE DETECTION

TECHNICAL FIELD

The present disclosure relates generally to communication networks, and more particularly, to analysis of data for network security.

BACKGROUND

Computer networks are exposed to a variety of different attacks that expose vulnerabilities of computer systems in order to compromise their security. Malware may be configured, for example, to maintain presence in targeted networks to steal financial and technical data while evading detection. The number of new malware samples seen each day continues to grow. Detection of malware requires a comprehensive profile detailing what the malware does. A security technology referred to as "sandboxing" is used to detect malware by providing a tightly controlled set of resources in which to execute code and analyze it for behavior and traits indicative of malware. However, malware creators are aware of sandboxing and attempt to evade sandbox detection. Advanced malware may be able to determine if it is in a sandbox and evade detection and description in a conventional sandbox environment.

BRIEF DESCRIPTION OF THE FIGURES

Corresponding reference characters indicate corresponding parts throughout the several views of the drawings.

DESCRIPTION OF EXAMPLE EMBODIMENTS

Overview

In one embodiment, a method generally comprises creating a set of network related indicators of compromise at a computing device, the set associated with a malicious network operation, identifying at the computing device, samples comprising at least one of the indicators of compromise in the set, creating sub-clusters of the samples at the computing device, and selecting at the computing device, one of the samples from the sub-clusters for additional analysis, wherein results of the analysis provide information for use in malware detection.

In another embodiment, an apparatus generally comprises a processor configured for creating a set of network related indicators of compromise, the set associated with a malicious network operation, identifying samples comprising at least one of the indicators of compromise in the set, creating sub-clusters of the samples, and selecting one of the samples from the sub-clusters for additional analysis, wherein results of the analysis provide information for use in malware detection. The apparatus further comprises memory for storing the set of network related indicators of compromise and the samples.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Malware samples are often able to evade detection in a conventional sandbox by using techniques designed to make their discovery more expensive or difficult. These techniques may include, for example: delayed execution, where some or all malware actions are delayed to get beyond the traditional five minutes of execution pseudo-time; more advanced approaches to delayed or conditional execution, where an entity outside of the sandbox provides time information and decides the content to be uploaded and executed; actions where the malware trigger is tied to expensive resource availability such as a graphical card with specific capability, computation resources, or lack of virtualization-specific features; dependence on realistic user behavior acquired and observed over a short time period (e.g., couple of triggering actions) or a long time period (activity statistics); or any combination of these or other techniques.

If these challenges were solved globally, the cost of sample execution would grow significantly and could make sandbox analysis prohibitively expensive. On the other hand, the malware needs to perform at least some actions to perform the above checks and to establish a foothold in the target environment. These actions would still be observable by sandboxing. This implies that a particular file that is malicious may still be able to be discovered, but it would not be possible to gain secondary intelligence from the run. Examples include discovery of command and control (C&C) nodes, structure of the malicious communication, payloads installed in later stages of the infections, and all actions related to "business" level of malware execution (e.g., information stealing or crawling attempts).

Sandboxing alone suffers from a number of drawbacks, which include isolation of individual runs and lack of context. If sandboxed samples were clustered directly, there would not be enough structure to prioritize interesting findings or correlate seemingly unrelated samples. Clustering based on binary artifacts of malware execution would not allow for distinguishing different criminal operations, as malware libraries, binaries, and code are frequently shared between malware families and operations. Communication alone may also not be enough to differentiate between legitimate and malicious traffic, as the infrastructure may be shared across operations fully or partially (although this is much less frequent in practice).

The embodiments described herein address the above issues by using information available in an initial sandboxing result and combining it with information gathered from traffic analysis to produce clusters of malware samples. In certain embodiments, a clustering algorithm uses data produced by traffic analysis for primary identification of samples and their initial selection. In each cluster, malware samples may be related by shared artifacts, communication behavior, or a combination of both. The cluster membership suggests that samples belong to a single malware family or a campaign managed by a single criminal organization.

As described in detail below, results from the analysis of network traffic are interconnected with results of sandboxing to identify similarities between malware samples in the sandbox runs. This allows for the identification of clusters of similar malware based on this combination. In certain embodiments, a small set of representative samples from each cluster may be identified and submitted for more thorough analysis and a longer sandbox run. Once in-depth analysis is complete, the results of the analysis may be associated with all of the samples from the original cluster, thus saving significant computation resources. Furthermore, selection of representative samples and comparison of results of the run across a heterogeneous set of environments may produce more robust results.

Figure 1:
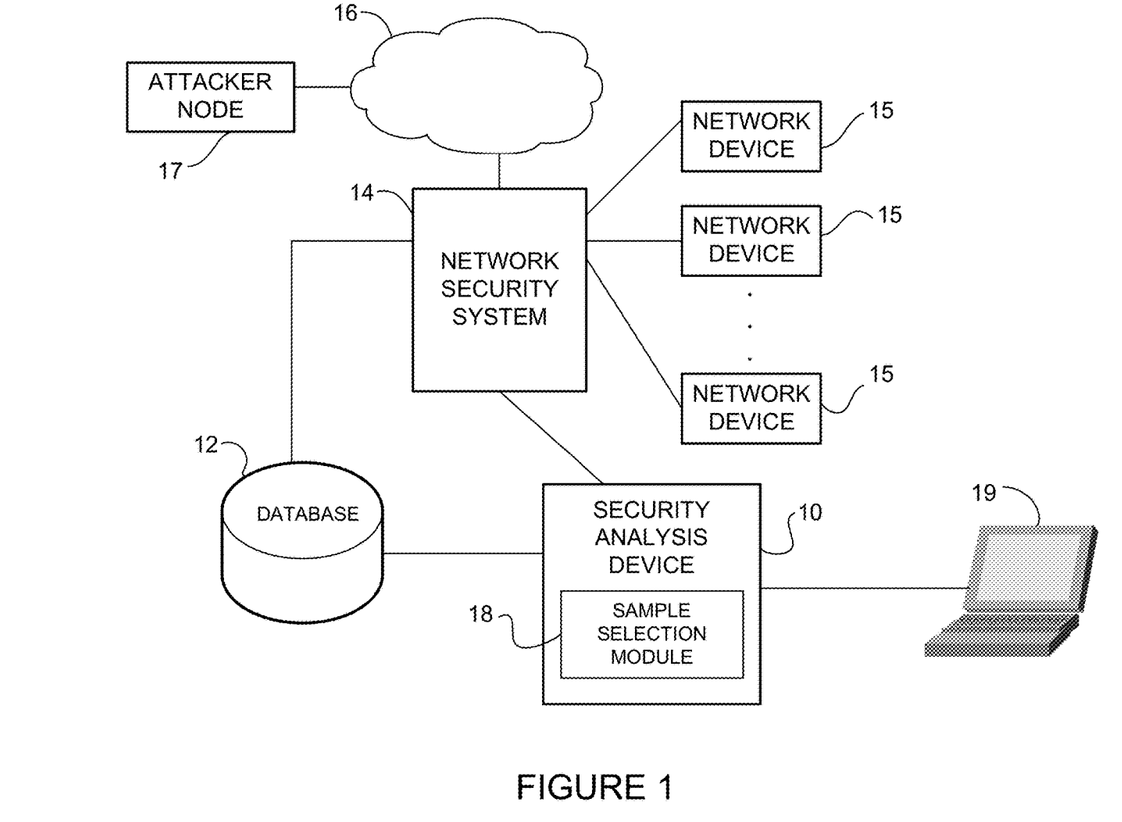
FIG. 1 illustrates an example of a network in which embodiments described herein may be implemented.

Referring now to the drawings, and first to FIG. 1, an example of a network in which embodiments described herein may be implemented is shown. For simplification only a small number of nodes are shown. The network includes a security analysis device 10, which receives data from a database 12 or network security system 14. The database 12 may include, for example, network performance data, number of bytes transferred, URLs (Uniform Resource Locators), IP (Internet Protocol) addresses, HTTP (Hyper Text Transfer Protocol) status, registry access, file system access, or any other data that may be collected by the network security system 14 or other collection device (e.g., gateway, proxy). The network security system 14 may manage security aspects of communications between network devices 15 and untrusted network 16. In the example shown in FIG. 1, the security analysis device 10 is in communication with a computer 19 (e.g., administrator computer) that may be used to retrieve information or reports about security threats.

As shown in FIG. 1, one or more attacker nodes (malicious site, source, device, command and control server, or group of devices) 17 may be in communication with network 16. One or more attacker nodes 17 may launch a malware attack on one or more network devices 15 (attacked node) via network 16. The attacker node 17 may be any type of entity capable of launching a cyber-attack and may include, for example, a physical device, computer user, computer domain, computer network, computer sub-network, and the like. Information about attack incidents may be collected and processed by the network security system 14. In one example, an attacked node may detect an incident, collect information about the incident, create a record that contains one or more characteristics of the incident, and transmit the incident data record to the security system 14.

The network may comprise any number of network devices 15 (e.g., hosts, endpoints, user devices, servers, computers, laptops, tablets, mobile devices, or other network devices or group of network devices) in communication via any number of nodes (e.g., routers, switches, controllers, gateways, access layer devices, aggregation layer devices, edge devices, core devices, or other network devices (not shown)), which facilitate passage of data within the network. The nodes may communicate over one or more networks (e.g., local area network (LAN), metropolitan area network (MAN), wide area network (WAN), virtual private network (VPN), virtual local area network (VLAN), wireless network, enterprise network, Internet, intranet, radio access network, public switched network, or any other network). Network traffic may also travel between a main campus and remote branches or any other networks.

The network security system 14 may comprise, for example, a firewall or other device operable to control network traffic by applying a set of rules to traffic, thus limiting traffic flow between trusted network devices 15 and untrusted external network 16. The network security system 14 may also comprise a gateway, proxy, or other network device operable to collect network performance data for traffic exchanged between network devices 15 and external network 16. Network performance data may include information about communications between devices, clients, users, subnetworks, and the like. Network performance data may also include information specific to file transfers initiated by the devices 15, exchanged emails, retransmitted files, registry access, file access, network failures, device failures, and the like. Other data such as bandwidth, throughput, latency, jitter, error rate, and the like may also be collected by the network security system 14. The network security system or other network traffic collection system may also be distributed throughout the network or operate at one or more network devices (e.g., firewall, gateway, proxy, threat prevention appliance, etc.), or cluster of network devices. For example, the network security system may comprise one or more proxy devices operable to collect network traffic data and forward to the security analysis device 10 or the database 12.

The database 12 may be a central storage device or a distributed storage system. The database 12 may also be located at the security analysis device 10 or security system 14. The database 12 may have a particular database schema or comprise a file system with one or more structured data files that may have various formats or schemas. The database 12 may store information about the attacks from the network security system 14 or information about attack incidents may be collected and processed by a third party system (not shown) and the processed information provided to the database 12 or security analysis device 10.

The security analysis device 10 may also receive network anomaly data from an Intrusion Detection System (IDS) (anomaly detection system)/Intrusion Prevention System (IPS) located at the network security system 14 or at a separate network device. The IDS may monitor data traffic and determine whether any malicious activities or policy violations occurred in the network. The IDS may be implemented, for example, in a firewall and may execute applications designed to detect malware. Upon detecting such an activity or a violation, the IDS may transmit information to a system administrator or network management station. The IPS may operate to prevent a detected threat from succeeding. The security analysis device 10 may provide information on security threats to the IDS/IPS within the network or located in another network. Information may also be gathered from a trust or security agent (e.g., Cisco Trust Agent, Cisco Security Agent) or any other device or system. The security analysis device 10 may, for example, learn what causes security violations by monitoring and analyzing behavior and events that occur prior to a security violation taking place, in order to prevent such events from occurring in the future.

The security analysis device 10 may be any computing device (e.g., server, controller, appliance, management station, or other processing device or network element). In certain embodiments, the security analysis device 10 is configured for performing sandboxing by running code and analyzing it for behavior and traits indicative of malware.

For example, the security analysis device 10 may comprise a controlled set of resources (processing, memory) for use in running code, with the ability to inspect the host system, read from input devices, or access a network disallowed or heavily restricted. The security analysis device 10 may be implemented in a single network device, a cluster of network devices, or a distributed system. For example, the security analysis device 10 may be implemented in a standalone server or network of servers, or as a cloud based service. The security analysis device 10 may also be located at the security system 14.

In one embodiment, the security analysis device 10 comprises a sample selection module 18 configured to process data received from the database 12, network security system 14, or any other network device or input device, identify similar malware samples, and select a subset of samples for further analysis. As described in detail below, the sample selection module 18 uses network related IOCs (Indicators of Compromise), which may comprise, for example a list of suspicious domains, URLs, or other identifiers that describe command and control infrastructure, malicious component downloads, or other malicious communications. The IOCs may be grouped into sets, as described below with respect to FIG. 4. In one embodiment, each IOC set is specific to a single malicious operation. Sandboxed (malware) samples may be identified that exhibit one or more of the IOCs from the set. Detailed information (e.g., sandboxing report) about the samples may be used to create coherent sub-clusters (sub-families) of samples from which representative samples may be selected for further analysis (e.g., longer sandbox run in a more realistic environment), as described below with respect to FIG. 5. Results of the analysis may be associated with samples from the sub-cluster, thus saving computation resources while providing robust results. The results provide details and description of malware, which can be used for malware detection.

The term "indicators of compromise" as used herein may refer to any indicator or identifier of a network resource or location (e.g., domain, URL, address, site, source) associated with a malicious operation or suspected malicious operation (e.g., command and control infrastructure, malicious component download or other malicious communication).

The term "sandbox", "sandboxed", or "sandboxing" as used herein refers to any mechanism or process for running code in a controlled computer system environment to analyze it for behavior and traits indicative of malware.

The term "malware" as used herein may refer to any malicious network traffic, operation, or security threat (e.g., program, application, software, download, or other executable instructions or code).

It is to be understood that the network shown in FIG. 1 and described above is only an example and that the embodiments described herein may be implemented in networks having different network topologies or network devices, without departing from the scope of the embodiments. For example, the sample selection module 18 may be installed in any computer (e.g., standalone or network device) operable to receive data from one or more sources and extract select samples for further analysis to identify malware.

Figure 2:
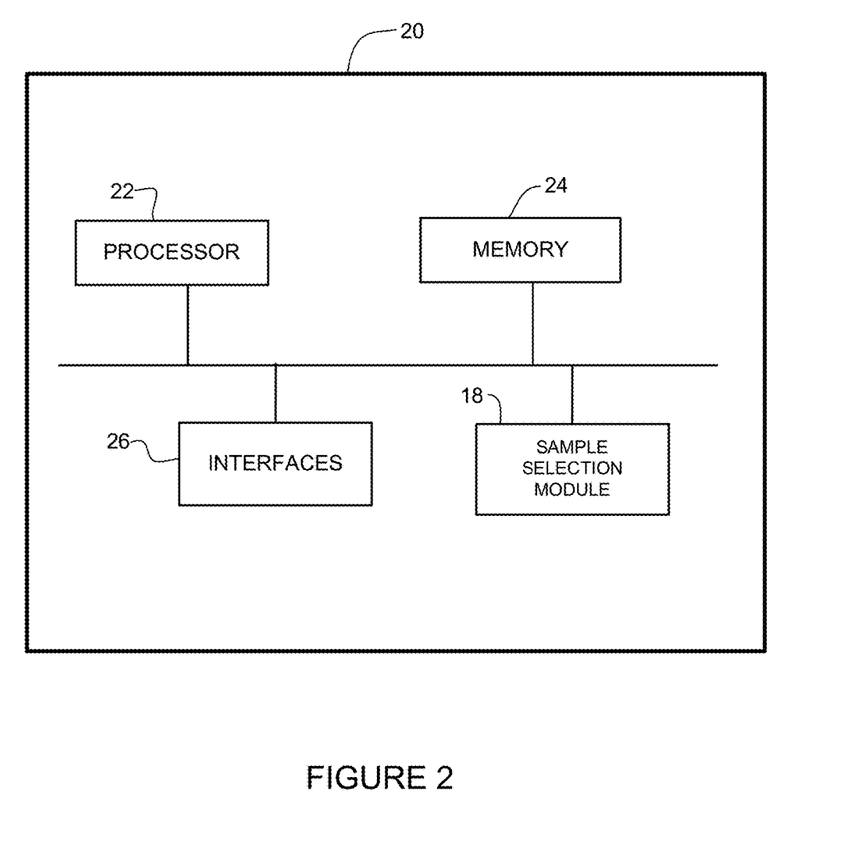
FIG. 2 depicts an example of a network device useful in implementing embodiments described herein.

FIG. 2 is a block diagram illustrating an example of a network device (computer, computing device) 30 (e.g., security analysis device 10 in FIG. 1) that may be used to implement embodiments described herein. The network device 20 is a programmable machine that may be implemented in hardware, software, or any combination thereof. The network device 20 includes a processor 22, memory 24, interfaces 26, and the sample selection module 18 (e.g., software, firmware, code, logic). Memory 24 may be a volatile memory or non-volatile storage, which stores various applications, modules, and data for execution and use by the processor 22. Memory 24 may store, for example, one or more components of the sample selection module 18.

Logic may be encoded in one or more tangible computer readable media for execution by the processor 22. For example, the processor 22 may execute codes stored in a computer-readable medium such as memory 24. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The interfaces 26 may comprise any number of interfaces (linecards, ports) for receiving data or transmitting data to other devices. The network interface 26 may include, for example, an Ethernet interface for connection to a computer or network. The network interfaces 26 may be configured to transmit or receive data using a variety of different communication protocols. The interfaces 26 may include mechanical, electrical, and signaling circuitry for communicating data over physical links coupled to the network.

It is to be understood that the network device 20 shown in FIG. 2 and described above is only an example and that different configurations of network devices may be used. For example, the network device 20 may further include any suitable combination of hardware, software, algorithms, processors, devices, components, modules, or elements operable to facilitate the capabilities described herein.

Figure 3:
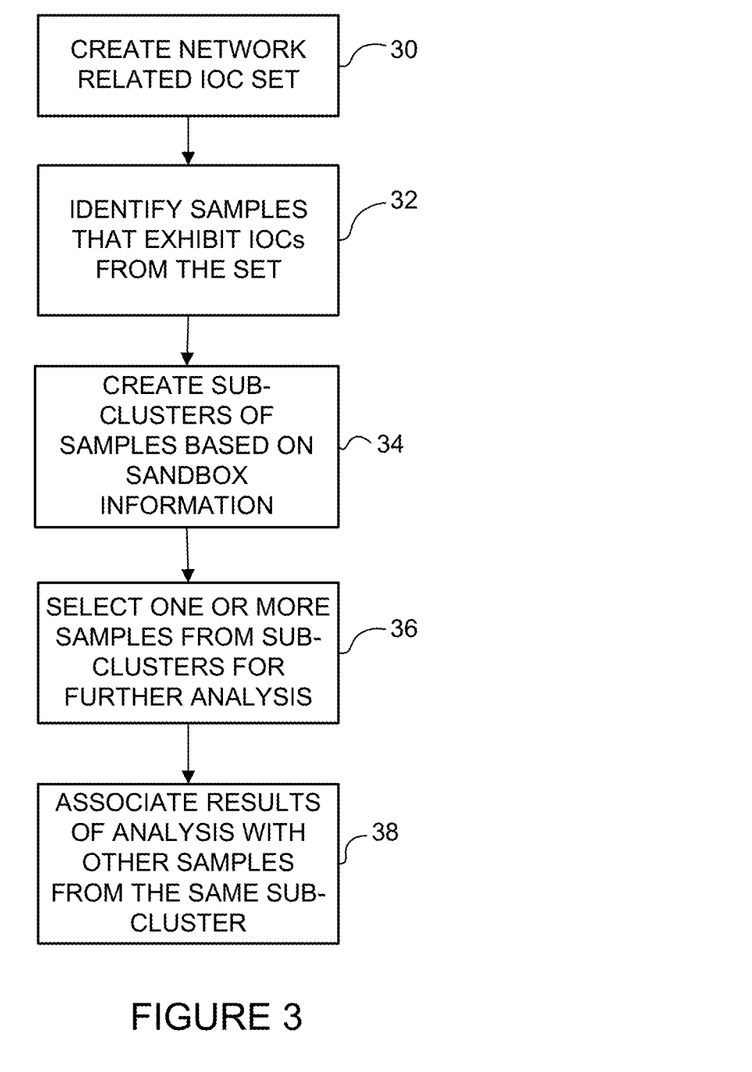
FIG. 3 is a flowchart illustrating an overview of a process for sample selection for data analysis for use in malware detection, in accordance with one embodiment.

FIG. 3 is a flowchart illustrating an overview of a process for selecting samples for data analysis for use in malware identification or detection, in accordance with one embodiment. Network related IOC (Indicators of Compromise) sets are created at step 30 at a computing device (e.g., security analysis device 10 in FIG. 1). The IOCs may be, for example, suspicious domains, URLs, or other identifiers describing command and control, malicious component downloads, or other malicious communications or infrastructure used to distribute or control malware. Each IOC set is associated with a single malicious operation. The IOC sets may be defined based on network information gathered from traffic analysis, as previously described. For each IOC set, sandboxed (malware) samples are identified that exhibit one or more of the IOCs from the set (step 32), as described further below with respect to FIG. 4. Detailed information (sandboxing report) is retrieved from a sandbox run of each sample and this information is used to create coherent sub-clusters (sub-families, subgroups) of samples (step 34), as described below with respect to FIG. 5.

In one embodiment, the sub-clusters each comprise samples differentiated by the presence of specific artifacts (e.g., file creation or modification, key creation, communication behavior). A representative sample from one or more of the sub-clusters is selected for further analysis (step 36). For example, one or more samples from each of the sub-clusters may be selected for a longer sandbox run in a more realistic environment. The results of the run may then be associated with all other samples from the sub-cluster from which the sample was selected (step 38), thereby enriching the data at a relatively low cost. Results of the analysis may include, for example, descriptions, characteristics, traits, behavior, or other information that may be used in malware detection.

It is to be understood that the process illustrated in FIG. 3 and described above is only an example and that steps may be added, removed, or modified, without departing from the scope of the embodiments. Also, it may be noted that the processor 22 or the sample selection module 18 shown in FIG. 2 (or a combination thereof) may implement one or more of the steps shown in FIG. 3 and described herein. For example, logic encoded on a computer readable media and executed by the processor 22 may be operable to perform one or more steps shown in FIG. 3.

Figure 4:
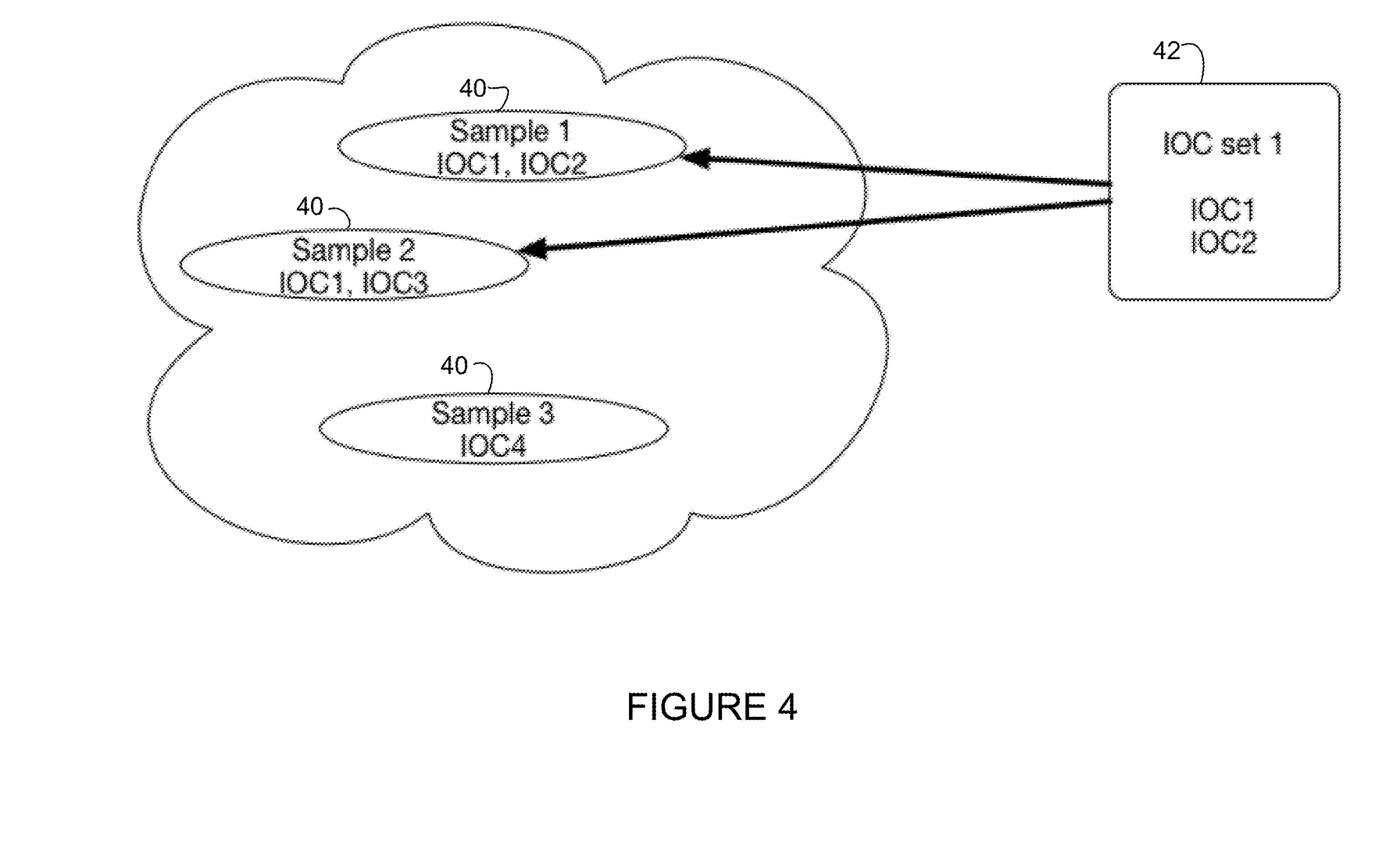
FIG. 4 illustrates an example of an indicators of compromise (IOC) set associated with various malware samples.

As described above with respect to step 30 of FIG. 3, network related IOCs are grouped into sets. FIG. 4 illustrates an example comprising three samples (malware samples, sandboxed samples) 40. Each sample 40 may comprise one or more network related IOCs (e.g., suspicious domains, URLs, etc.). In the example shown in FIG. 4, sample 1 includes IOC1 and IOC2, sample 2 includes IOC1 and IOC3, and sample 3 includes IOC4. Network related IOC sets 42 are each associated with a single malicious operation (e.g., command and control infrastructure, malicious communication). In the example shown in FIG. 4, IOC set 1 includes IOC1 and IOC2. IOC set 1 may, for example, be associated with a malicious communication received from two URLs (IOC1 and IOC2).

In one embodiment, a sandboxing report is retrieved for the run of each sample in the set. For example, for IOC set 1, a sandboxing report would be retrieved for samples 1 and 2 since sample 1 includes IOC1 and IOC2 (both in IOC set 1) and sample 2 includes IOC1. Information from the sandboxing report is used to create sub-clusters as shown in FIG. 5.

Figure 5:
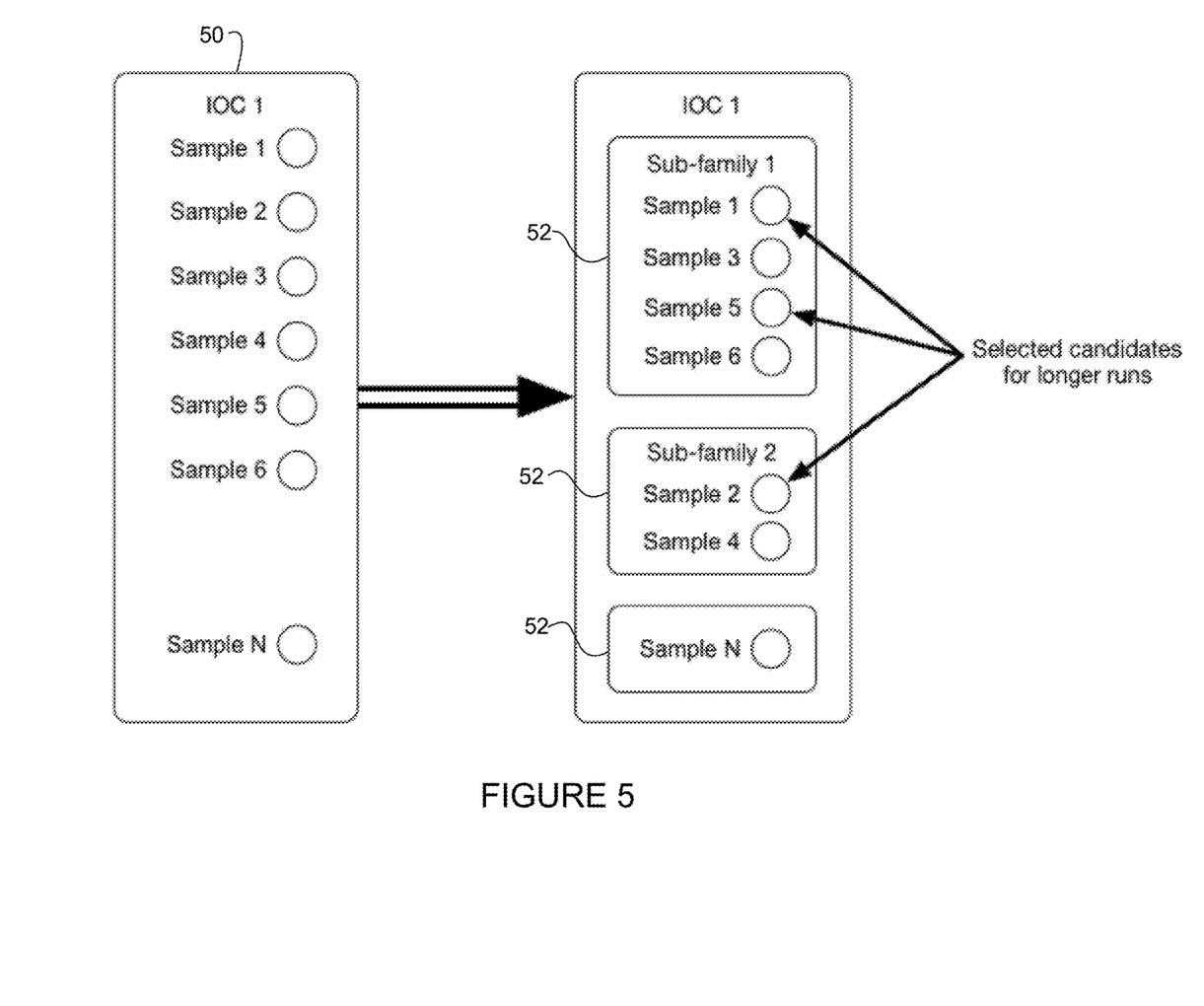
FIG. 5 is an example illustrating organization of malware samples in the IOC set into sub-clusters from which representative samples are selected for further analysis.

In the example shown in FIG. 5, IOC set 50 (IOC 1) contains N samples, which are grouped into three sub-families (sub-clusters) 52. In this example, sub-family 1 contains samples 1, 3, 5, and 6 and sub-family 2 contains samples 2 and 4. Each IOC set 50 may include any number of samples and the samples may be grouped into any number of sub-clusters. As previously described, one or more representative sample may be selected from each sub-cluster for a longer sandbox run in a more realistic environment. An example of a process for creating the sub-clusters 52 is described below.

In certain embodiments, related samples may be identified using artifacts dropped by the sample executable during the sandbox run. Since malware needs to persist on the attacked computer between reboots, the malware needs to store its code and data, and also needs to store the code and data related to monetization activities. Modifications of the host may demonstrate themselves in the form of artifacts, such as file creation or modification, key creation, and the like. This allows for identification of similarity between two malware samples based on the similarity of sets of their artifacts.

In certain embodiments, a graph clustering algorithm may be used to cluster malware samples (found for a specific IOC set) into sub-clusters. Examples of graph clustering algorithms include modularity clustering, Markov clustering, repeated random walks, or any other suitable graph clustering technique. One of the main benefits of using a graph clustering algorithm is that it only requires a similarity function, rather than a full metric, which allows for the use of a wider set of similarity functions.

In the following example, a graph G is defined with weighted edges. Each vertex/node is one malware sample, denoted S. The weight associated with an edge between vertices (samples) $S_1$ and $S_2$ is defined by sample similarity function $s(S_1, S_2)$. Low-weight edges may be pruned by the algorithm to reduce the computational complexity.

In order to cluster malware samples, a similarity function $s(S_1, S_2)$ is defined. Examples of similarity functions that may be used include Jaccard Index (Jaccard similarity coefficient), average similarity between artifacts, cosine similarity with TF-IDF (Term Frequency-Inverse Document Frequency) scaling, or other suitable functions. The following describes an example using cosine similarity with TF-IDF scaling.

The cosine similarity of malware samples $S_1$ and $S_2$ may be defined as follows:

$$s(S_1, S_2) = \frac{X_{S_1} X_{S_2}}{|X_{S_1}||X_{S_2}|}$$

where vectors $X_{S_1}$ and $X_{S_2}$ represent feature vectors of samples $S_1$ and $S_2$ in Bag-of-Words model (BoW model), a well-established approach in the field of information retrieval or natural language processing. In BoW model, each document is represented by feature vector $X_{S_1}(i)$ where every element i refers to a number of occurrences of a corresponding word from a dictionary in the document $S_1$. In this example, a document represents a sample and words represent artifacts.

Direct use of artifacts as words in the BoW model may not be optimal as the artifacts have different checksum, paths, or both. Such similarity function may fail to capture the similarity between two samples that modify similar but not the same files (e.g., file /Documents and Settings/Administrator/Application Data/Ywxixi/weakgy.exe as compared to file /Documents and Settings/Administrator/Application Data/Zovies/xaaciw.exe). In order to solve this problem, the artifacts may be clustered into groups and these groups used as words in the BoW model. An example of this sub-algorithm is described below.

In one embodiment, the next step includes eliminating the influence of common artifacts (e.g., artifacts created by the reaction of the host OS (operating system) and other indirect or accessory modifications). In one example, TF-IDF scaling is performed to suppress the influence of these low-impact artifacts that do not provide any additional separability (e.g., Windows log files, Internet browser's temporary file, etc.).

TF-IDF scaling may be used to weight the significance of a word (term) to a document and is defined as follows:

TF-IDF$(t,d,D)$=tf$(t,d)$·idf$(t,D)$ where t is the term, d is the document, and D is a collection of documents. The first element represents frequency of term t in document d. It may be noted that there are a number of different definitions of the term frequency (Boolean, raw frequency, augmented frequency, etc.). In this example logarithmically scaled frequency is used:

$$tf(t, d) = \begin{cases} 0 & \text{if } f(t, d) = 0 \\ 1 + \log(f(t, d)) & \text{otherwise} \end{cases}$$

where f(t, d) is frequency of word t in document d. The second term captures the specificity of term t and may be defined as follows:

$$idf(t, D) = \log \frac{|D|}{|\{d \in D \mid t \in d\}|}$$

In the above example, the term t represents an artifact group, document d represents a sample, and collection of documents D is the set of all samples for a single IOC set.

The calculation of the sample similarity may be summarized into the following steps, in accordance with one embodiment:
1. Cluster all the artifacts related to all samples relevant for a given IOC set into groups.
2. Extract BoW model of samples using the partitioning defined in previous step.
3. Apply TF-IDF scoring to feature vector of each sample to discount the value of common artifact groups.
4. Compute cosine similarity between samples using the updated feature vectors.

In order to cluster artifacts into coherent groups (log files, temporary files, etc.) a graph clustering algorithm may be used where the graph captures similarity between individual artifacts. It may be noted that this is a recurrent application of the sample clustering algorithm described above. Since it is much harder to randomize the file path efficiently (e.g., by dynamic modification of running code) than checksum of an artifact (e.g., by adding random content to the end of the file), the file path similarity is used rather than similarity between checksums.

The file path similarity may be defined as follows:

$$s_A(P, Q) = \prod_{i=0}^{l} s(P_i, Q_i)$$

where P, Q are file paths split by a path-separator character (usually '/'), and l=max(len(P), len(Q)). The term $s(P_i, Q_i)$ denotes the similarity between individual parts of the file path (folders) for which three different types of folders may be defined:

known folder—folder is from predefined list of folders with specific meaning (e.g., C:\Windows, System32, Document and Settings)

generic folder (MSHist012014110620141107—part of c:\Documents and Settings\Administrator\LocalSettings\History\History.IE5\MSHist012014110620141107\)

file (Folders.dbx)

If types of $P_i$ and $Q_i$ are the same, the similarity $s(P_i, Q_i)$ may be defined as follows:

known folder:

$$s(P_i, Q_i) = \begin{cases} 1 & \text{if } P_i = Q_i \\ 0 & \text{otherwise} \end{cases}$$

generic folder:

$$s(P_i, Q_i) = \text{constant}$$

file:

$$s(P_i, Q_i) = \max\left(0.5, 1 - \frac{levenshteinDistance(P_i, Q_i)}{\max(len(P_i), len(Q_i))}\right)$$

If types of $P_i$ and $Q_i$ differ the similarity $s(P_1, Q_i)$=constant.

It is to be understood that the algorithms set forth above are only examples and that other algorithms, equations, functions, variables, or constants, may be used without departing from the scope of the embodiments.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
processing data received from a database at a computing device to provide an analysis of network traffic;
creating a set of network related indicators of compromise from the processed data at the computing device, said set associated with a malicious network operation;
identifying at the computing device, samples comprising at least one of the indicators of compromise in said set;
creating sub-clusters of said samples at the computing device, wherein creating sub-clusters comprises retrieving sandbox information for said samples for use in creating said sub-clusters; and
selecting at the computing device, one of said samples from one of said sub-clusters for additional malware sample analysis and associating results of said additional malware sample analysis with other of said samples from the sub-cluster to provide information for use in malware detection;
wherein results from the analysis of network traffic are interconnected with the sandbox information to create said subclusters of said samples.

2. The method of claim 1 wherein selecting one of said samples comprises selecting one or more of said samples to represent each of said sub-clusters.

3. The method of claim 1 wherein creating said sub-clusters comprises creating said sub-clusters based on artifacts of said samples.

4. The method of claim 1 wherein creating said sub-clusters comprises computing similarity between said samples.

5. The method of claim 1 wherein creating said sub-clusters comprises utilizing a graph clustering algorithm.

6. An apparatus comprising:
a processor configured for creating a set of network related indicators of compromise, said set associated with a malicious network operation, identifying samples comprising at least one of the indicators of compromise in said set, creating sub-clusters of said samples, selecting one of said samples from one of said sub-clusters for additional malware sample analysis, and associating said results of said additional analysis with other of said samples in a sub-cluster containing said selected sample, wherein results of the analysis provide information for use in malware detection; and
memory for storing said set of network related indicators of compromise, said samples, and network traffic analysis;
wherein the sub-clusters are created based on sandbox information and said network traffic analysis.

7. The apparatus of claim 6 wherein selecting one of said samples comprises selecting one or more of said samples to represent each of said sub-clusters.

8. The apparatus of claim 6 wherein creating said sub-clusters comprises creating said sub-clusters based on artifacts of said samples.

9. The apparatus of claim 6 wherein creating said sub-clusters comprises computing similarity between said samples.

10. The apparatus of claim 6 wherein creating said sub-clusters comprises utilizing a graph clustering algorithm.

11. One or more non-transitory computer readable media comprising logic encoded for execution and when executed operable to:
   process data to provide an analysis of network traffic;
   create a set of network related indicators of compromise, said set associated with a malicious network operation;
   identify samples comprising at least one of the indicators of compromise in said set;
   retrieve sandbox information for said samples for use in creating sub-clusters;
   create said sub-clusters of said samples;
   select one of said samples from one of said sub-clusters for additional malware sample analysis; and
   associate said results of said additional malware sample analysis with other of said samples from the sub-cluster containing said selected sample to provide information for use in malware detection;
   wherein results of the analysis of network traffic are interconnected with the sandbox information to create said subclusters of said samples.

12. The computer readable media of claim 11 wherein creating said sub-clusters comprises creating said sub-clusters based on artifacts of said samples.

13. The computer readable media of claim 11 wherein creating said sub-clusters comprises computing similarity between said samples.

14. The computer readable media of claim 11 further operable to run said selected sample in a sandbox.

15. The computer readable media of claim 11 wherein selecting one of said samples comprises selecting one or more of said samples to represent each of said sub-clusters.

16. The computer readable media of claim 11 wherein creating said sub-clusters comprises utilizing a graph clustering algorithm.

* * * * *